A. H. & H. A. BERNS.
CORN SHELLER CYLINDER AND TEETH.
APPLICATION FILED MAR. 14, 1910.
1,064,699.
Patented June 17, 1913.
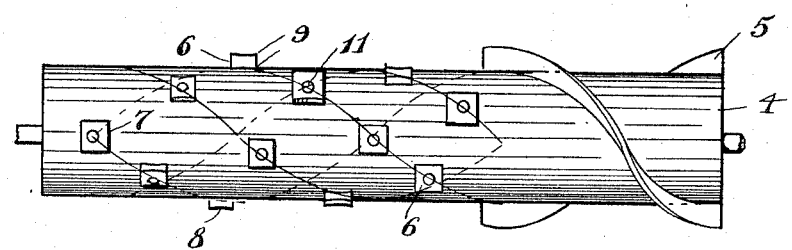
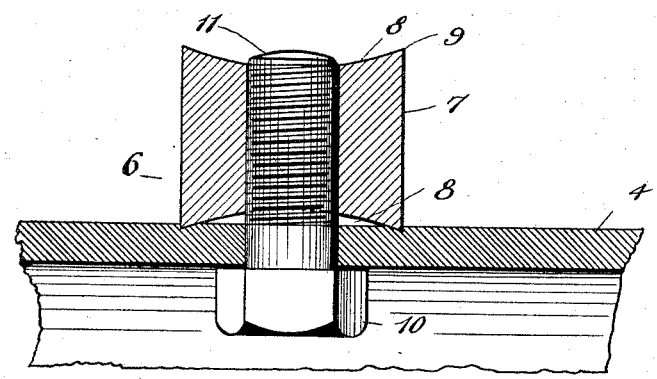
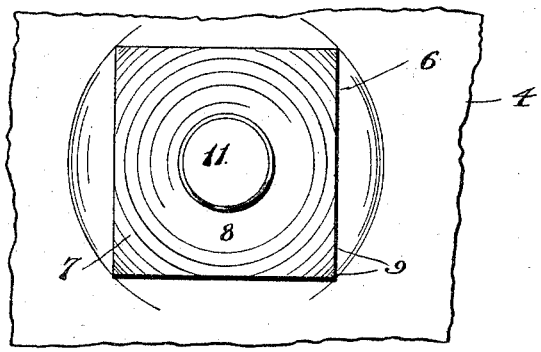
Witnesses:
Inventors:
Andrew Herman Berns,
and Herman Andrew Berns.
By Glenn S. Noble
Att'y.

UNITED STATES PATENT OFFICE.

ANDREW HERMAN BERNS AND HERMAN ANDREW BERNS, OF CHEBANSE, ILLINOIS.

CORN-SHELLER CYLINDER AND TEETH.

1,064,699.     Specification of Letters Patent.     Patented June 17, 1913.

Application filed March 14, 1910. Serial No. 549,264.

*To all whom it may concern:*

Be it known that we, ANDREW HERMAN BERNS and HERMAN ANDREW BERNS, citizens of the United States, residing at Chebanse, in the county of Iroquois and State of Illinois, have invented certain new and useful Improvements in Corn-Sheller Cylinders and Teeth, of which the following is a specification.

This invention relates to cylinders and teeth for corn-shellers and is particularly applicable to that class of shellers in which the corn is fed in at one end of the cylinder and moves longitudinally of the cylinder as it is being shelled, the shelling action taking place between the cylinder and a suitable casing. Its objects are to provide a cylinder of simple construction, which will be of relatively large capacity, and also to provide teeth or shelling devices which may be made of hard resisting material, without liability of breaking the same or their connecting or fastening means, and to form such teeth or shelling devices so that they may be turned to present different working faces to the material, and also to provide such other novel features as will be clearly pointed out and described hereinafter and which are shown in the accompanying drawings, in which—

Figure 1 is a side view of a cylinder embodying the principal features of this invention; Fig. 2 is a sectional view showing one of the teeth or shelling devices in position on the cylinder; and Fig. 3 is a top plan view of the device shown in Fig. 2.

As indicated in these drawings, 4 represents a pipe or tube preferably formed of iron or steel and adapted to be mounted in the casing of a corn-sheller. At the feeding end of the cylinder, we provide spiral wings or blades 5 for forcing the corn from such feeding end toward the shelling portion proper of the cylinder. Instead of continuing such spiral blades for the purpose of performing the shelling action, we have provided the principal remaining portion of the cylinder with angular teeth or shelling devices 6, these angular shelling devices being preferably arranged along substantially spiral lines around the cylinder, as indicated in Fig. 1. For general use, we have found that two spiral feeding blades 5 on the feeding end of the cylinder and four spiral lines of teeth give exceedingly good results, particularly if the teeth are also arranged in staggered relation as also indicated in Fig. 1.

The teeth or shelling devices 6 comprise rectangular blocks or members 7, preferably having four sides, and counter-bored, recessed, or hollowed out as indicated at 8, on both ends, or upper and lower sides, as clearly shown in Figs. 2 and 3. This recessing or counter-boring leaves sharp edges or corners 9. These teeth are held in position on the cylinder proper by means of bolts or lag screws 10 preferably having threads engaging with the tapped or threaded holes 11 in the teeth.

When the shelling teeth or devices 7 are to be assembled in place on the cylinder proper 4, the bolts or screws 10 are pushed through holes 12 in the tube and the heads held while the teeth are screwed down to position, the sharp edges or corners 9 of the teeth serving to cut away or abraid the rounded surface of the pipe or tube sufficiently so that the teeth will be firmly seated on such outer surface and also prevented from readily becoming loosened. On account of this construction, the teeth 7 may be made of suitable material and case-hardened or tempered in order to make them hard and resisting, while at the same time the bolts or screws 10 are left untempered, that is they are left sufficiently soft or tough so that they will not be readily broken even when the teeth strike any unusually hard or non-yielding articles which may become mixed with the corn which is being shelled. It will also be noted that, if desired, the teeth 7 may be made of some such material as manganese steel, which will resist wear, while the bolt may be made of mild steel, thereby providing a lasting wearing portion as well as an exceedingly strong holding portion. After the front or engaging faces or corners of the teeth have become worn, they may be loosened and turned sufficiently to present a new face, thereby providing a large number of wearing surfaces. Furthermore, after the outer portions of the teeth have become worn, that is the portions farthest from the cylinder, they may be entirely removed and replaced with the outer portion adjacent to the cylinder, and such portion will fit the cylinder closely on account of being counter-bored as above described. The end of the tooth, which was formerly the inner end, having been more or less protected from wear, then furnishes new shelling surfaces, so that such teeth may be used for a long time before needing to be renewed.

The operation of this invention will be readily understood by those familiar with such shelling machines. The spiral blades on the feed or inlet end of the cylinder force the corn on the cob forwardly into the shelling portion proper upon which the teeth are arranged. These teeth, acting in conjunction with the outer casing, will rapidly and effectively shell the corn, while at the same time, on account of their spiral arrangement, will also tend to drive the cobs forwardly to the discharge end.

Having thus described our invention, which we do not wish to limit to the details of construction or arrangement of parts as set forth herein, except as specified in the appended claims, what we claim and desire to secure by Letters Patent is:

1. A new article of manufacture, comprising a tooth for a corn sheller cylinder, of substantially rectangular cross section with a hole extending longitudinally through the same, the ends of said tooth being cut away adjacent to the hole so that the outer edges of the tooth will engage with the cylinder.

2. A tooth for a corn-shelling cylinder, of angular cross-section and having one or both of its ends spherically concaved to form sharp cutting edges and to permit its close engagement with the cylinder and having a threaded hole therethrough.

ANDREW HERMAN BERNS.
HERMAN ANDREW BERNS.

Witnesses:
JULES GRAVELOT,
F. J. JUNESEN.

---

Copies of this patent may be obtained for five cents each, by addressing the "Commissioner of Patents, Washington, D. C."